United States Patent [19]

Mannion

[11] 4,281,242

[45] Jul. 28, 1981

[54] BALANCING APPARATUS FOR MAGNETIC CIRCUITS EMPLOYED IN DATA STORAGE AND RETRIEVAL SYSTEMS

[75] Inventor: Robert S. Mannion, Carbondale, Pa.

[73] Assignee: Continental Instruments Corporation, Hicksville, N.Y.

[21] Appl. No.: 120,669

[22] Filed: Feb. 11, 1980

[51] Int. Cl.³ .................. G06K 7/08; G11B 5/43; G11B 5/20
[52] U.S. Cl. .......................... 235/449; 360/26; 360/123
[58] Field of Search ............... 235/449, 450; 360/121, 360/123, 2, 25, 26

[56] References Cited

U.S. PATENT DOCUMENTS

| | | | |
|---|---|---|---|
| 3,651,282 | 3/1972 | Gerry | 360/123 |
| 3,728,523 | 4/1973 | Torok | 235/449 |
| 4,130,242 | 12/1978 | Mannion | 235/450 |

Primary Examiner—Daryl W. Cook
Attorney, Agent, or Firm—Arthur L. Plevy

[57] ABSTRACT

A balancing apparatus particularly useful in a quadrature magnetic head pickup device employs separate amplitude and phase detecting circuitry. A phase detector provides a DC level indicative of a phase variation between a reference signal and a random signal to be compensated. A DC signal is provided which then causes a phase shifter to provide a square wave output indicative of a phase lag or lead, which phase signal is of a magnitude to compensate for the phase angle error of the random signal. An amplitude detector compares the amplitude of the random signal with a predetermined reference signal to provide another DC voltage signal indicative of the amplitude offset. The generated phase and amplitude signals are combined in a summing amplifier to provide an output signal which is fed back to the drive circuitry associated with a magnetic head to compensate for the random signal over a wide range of temperatures. The circuitry provides an output null over a wide temperature range to enable accurate and reliable operation of the magnetic head during a valid read operation associated with the presence of a magnetic material in the vicinity of the head.

11 Claims, 10 Drawing Figures

BALANCING APPARATUS FOR MAGNETIC CIRCUITS EMPLOYED IN DATA STORAGE AND RETRIEVAL SYSTEMS

BACKGROUND OF THE INVENTION

This invention relates to balancing apparatus for a magnetic head, and more particularly to such apparatus for providing an acceptable balance over a wide temperature range for a "U" shaped magnetic head with a central pickup member.

Magnetic heads are employed in a variety of circuits for responding to magnetic data on a tape, credit card and in other system applications. A particularly unique and useful apparatus is disclosed in U.S. Pat. No. 4,130,242 entitled Data Storage and Retrieval System Employing Balanced Magnetic Circuits issued on Dec. 19, 1978 to Robert S. Mannion and assigned to the Assignee herein.

In the above cited patent, a data storage retrieval system employs a magnetic circuit read head which essentially consists of first and second parallel pole members. Positioned between the poles is a pickup means which may be mounted on a common base of the pole members to provide an "E" shaped core. The pickup member is centrally located and has a pickup coil associated therewith. The member as positioned between the poles is located at a point which provides a zero output across the pickup coil when the parallel poles are excited by a source of alternating potential. A magnetic material which preferably is positioned on an information carrying card, when inserted in the vicinity of the poles, will effect the flux lines between one of the poles and the pickup means. Based on whether the magnetic material is positioned on the left or the right of the pickup coil, it will provide a signal across the coil indicative of a binary one or a binary zero. Based on the unbalance, the pickup coil provides a sinusoidal signal of a reference phase indicative for example, of a binary one or of a phase shifted 180° with respect to the reference phase; which phase may be indicative of a binary zero.

In any event, as described in the above noted patent, such magnetic heads are balanced to provide a null voltage relatively equal to zero from the pickup coil during a quiescent condition. Essentially, if this system is operated in a controlled environment such as in a bank, a store, or in an indoor environment maintained at a relatively constant temperature, there is no problem in maintaining a null or a balance based on temperature of operation. If the unit is not operated in a controlled environment as, for example, outdoors or in any environment where there is a substantial change in temperature, there is a problem manifesting itself in a change in the null. As can be ascertained from the above noted patent, a proper null is important to proper operation. Based on temperature changes, the respective coils on the magnetic core shift in a random fashion and hence, produce nulls which are unpredictable as being a function of the particular shift of a particular coil and hence, the shifting of the null voltage occurs in a relatively random fashion in response to temperature changes.

To achieve a good null, the magnetic head must exhibit almost perfect quadrature. Essentially, the resulting magnetic flux from the parallel poles must be equal in both phase and amplitude. Due to the fact that the changes in null are random and non-repeatable for each coil, prior art feedback techniques are not applicable.

Conventional compensating techniques require a plurality of complex and sophisticated circuitry which, essentially, increase the cost and complicate the system operation. The difficulty resides in that to achieve quadrature, one must implement two separate feedback loops and hence, one loop is necessary to control amplitude, while a second loop is necessary to control phase. The control of amplitude and phase must be implemented by means of reliable and economical circuitry, while maintaining a minimum of circuit components to achieve a null voltage over a wide range of temperatures.

BRIEF DESCRIPTION OF THE PREFERRED EMBODIMENT

A balancing apparatus for providing a null at the output of a quadrature circuit, of the type driven by a drive source for providing a first signal at a given frequency and of a reference phase and a second signal at the same frequency of a phase relatively about said reference phase, said circuit operating to provide a null signal at an output manifesting a zero voltage output during a balanced condition when said quadrature circuit is not effected by the presence of a desired unbalancing means, said quadrature circuit undesirably providing a random output signal at said frequency due to an undesired unbalance as manifested by an interfering external source, comprising first means responsive to said random output signal to provide an amplified version of said signal at said given frequency, amplitude detecting means responsive to said random output signal to provide an amplitude compensating signal at said frequency indicative of the amplitude of said random signal, phase detecting means operative to provide a DC error signal indicative of the phase of said random signal with respect to a predetermined reference phase, comparator means operative to compare a reference waveform at a first input with a DC reference level at a second input to provide at an output a phase compensating signal at said frequency having a phase indicative of the difference between said reference waveform and said DC level, means for generating a reference waveform indicative of a reference phase from said drive source for applying said reference waveform to said first input of said comparator means, means for applying said DC error signal to said second input of said comparator means to cause said comparator means to provide at said output, said phase compensating signal of a phase determined by said DC error signal, summing means responsive to said amplitude compensating signal and said phase compensating signal to provide at the output, a summed signal indicative of the phase and amplitude of said random signal, and means for applying said summed signal to said drive source to compensate for said random signal and therefore for said unbalance as manifested by said interfering external source.

DETAILED DESCRIPTION OF THE INVENTION

Figure 1:
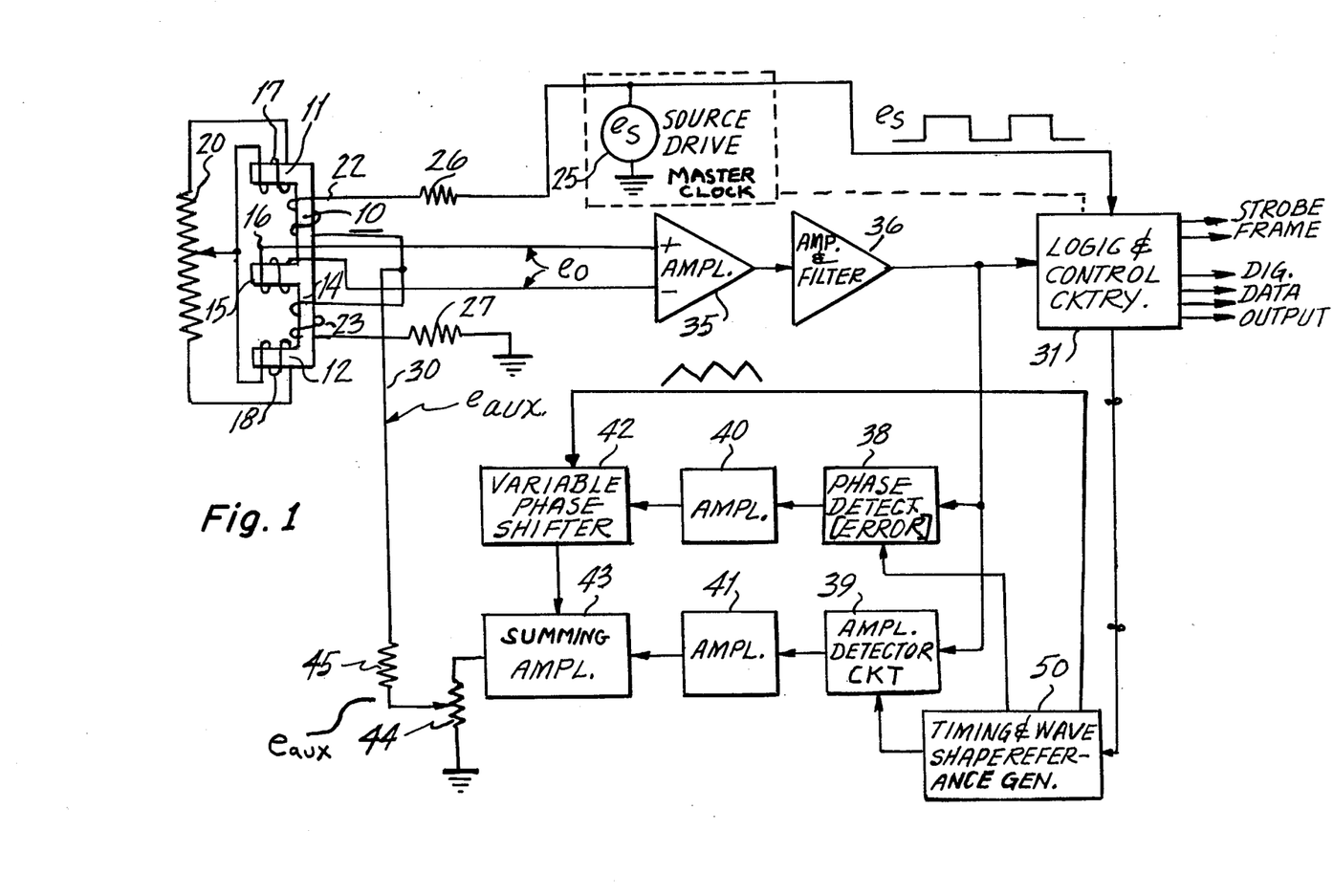
FIG. 1 is a block diagram of a balancing apparatus for a magnetic circuit according to this invention.

Referring to FIG. 1, there is shown an "E" shaped core 10. As described in the above noted patent, the E shaped core 10 consists of a first pole 11 relatively parallel to a second pole 12 and joined together on a common base member 14. A central pickup pole 15 is positioned centrally to poles 11 and 12 and has a pickup coil 16 disposed thereon. The poles 11 and 12 are associated with respective coils 17 and 18. A common winding of coils 17 and 18 is directed to the variable arm of a potentiometer 20. The opposite terminals of the potentiometer 20 are directed to the other end of each winding as 17 and 18.

As one can see from FIG. 1, the potentiometer 20 is a balancing potentiometer and is operative to provide a null (zero voltage) at the pickup coil 16 during the absence of any magnetic material positioned between poles 11 and 15 or poles 12 and 15. As is understood, the potentiometer 20 can operate to provide a null condition at the pickup means 16.

It is understood that based on the following description of operation, that the potentiometer 20 may be eliminated in its entirety based on the balancing circuitry to be described. In any event, one may use a potentiometer as 20 to balance the magnetic circuit when the magnetic head is operating in a controlled temperature environment.

Shown positioned on the base 10 of the E shaped member are drive coils 22 and 23. The drive coils are activated from a source of alternating potential $e_s$ which may be an astable multivibrator and so on. Accordingly, an output from the source $e_s$ is directed through a current limiting resistor 26 to one terminal of the coil 22. The other terminal of coil 22 is connected to a terminal of coil 23, while the opposite terminal of coil 23 is connected to ground through a current limiting resistor 27 which is of the same value as resistor 26. As is understood, the drive source 25 causes currents to be provided in coils 17 and 18 which are relatively equal in amplitude and phase. In this manner, the voltage provided at the output of the coil 16 designated as $e_o$ is zero for a perfect balance.

As above described, a balance or null is achieved at one particular temperature and if the temperature varies, for example, by ±10°, the shift of the coils as 22 and 23 on the base 14 will result in an unbalance and hence, destroy the null condition.

Before describing the circuitry for providing a null, it is noted that such circuitry will eliminate the potentiometer 20 as well as coils 17 and 18 and a null condition will be automatically achieved. It is noted that the common connection between the drive coils 22 and 23 is directed via lead 30 to the output of the balancing circuit. The balancing circuit provides a signal at the output designated as $e_{aux}$; which signal will maintain balance between the drive coils over a wide range of temperatures and therefore assure balance between poles 11 and 12.

Before proceeding further, it is noted that the drive source 25 which as indicated, may be an astable multivibrator or a synchronous oscillator, is operative to provide a square wave at its output. The square wave is shown directed to module 31 designated as logic and control circuitry. Essentially, the magnetic head 10 is one of a plurality of heads. Each head as 10 serves to respond to a different control track or data channel located on a credit card or a similar article. Hence, as can be ascertained from the above noted patent, each head as 10 is scanned during an appropriate time interval to provide an output indicative of whether the data is a one or a zero. The logic and control circuitry, as will be further explained, is typical digital circuitry which monitors a plurality of magnetic head outputs to provide the necessary data signals in proper sequence. The logic and control circuitry is synchronized to the signal emanating from the drive source 25, which may be employed as a master clock for operation of the digital logic circuitry. For a general description of such circuitry which is conventional, reference is made to the above noted patent where a data and retrieval system employing magnetic heads such as 10 is fully described.

As indicated, the output signal $e_o$ from the pickup coil will manifest a signal of a phase corresponding to a binary zero or a signal of a phase corresponding to a binary one, if a magnetic material is emplaced between pole 12 and 15 or between pole 11 and 15. The output from the pickup coil is a differential output. This output is applied to an integrated amplifier 35 having a relatively high gain (60 dB). The output of the integrated amplifier 35 is directed to the input of an amplifier and filter circuit 36. Circuit 36 may also be an operational amplifier having a suitable RC feedback network to provide selective filtering at the fundamental frequency of the drive source $e_s$. Accordingly, the output of the amplifier 36 provides a sinusoidal signal of a frequency determined by the fundamental frequency of the drive source $e_s$. This signal is applied to the logic and control circuitry 31 where it is compared with a first phase reference signal and a second phase reference signal which is 180° out of phase with the first signal. In this manner, the logic and control circuitry determines whether the output from the head 10 is indicative of the binary one or zero. As one can ascertain, the technique of detecting or determining a zero reference phase or a 180° reference phase is known in the art and any such technique will suffice.

As is understood from the above description, based on temperature changes, the output signal $e_o$ may not be at null and hence, the head 10 will provide a random output signal during the absence of a magnetic material between the poles as described. This random signal will adversely effect operation of the circuitry. The compensation circuitry operates to provide a compensating signal $e_{aux}$ to the drive coils 22 and 23 to assure the balance of the magnetic head as a function of the error signal indicated by the pickup coil 16 during the absence of a magnetic material disposed between the respective poles as described.

The output of the amplifier and filter 36 which is indicative of the error signal is directed to the input of a phase detector 38 and an amplitude detector 39. Essentially, the phase detector operates to detect the magnitude of the phase error during a gated interval as will be explained. The amplitude detector 39 operates to detect the amplitude of the error signal during a separate gating interval.

As seen from FIG. 1, the output of the phase detector 38 and the amplitude detector 39 are directed to inputs of amplifiers 40 and 41. The output of the amplifier 40 is applied to the input of a variable phase shifter 42, whose output is directed to one input of a summing amplifier 43. The output of amplifier 41 which is associated with the amplitude error is directed to the other input of the summing amplifier 43. The amplifier 43 provides a summed output which is indicative of the phase and amplitude of the error signal. The output of the summing amplifier 43 is coupled to a potentimeter 44 which has its variable arm coupled via a resistor 45 to the common connection between the drive coils 22 and 23. The signal provided at the output of the potentiometer 44 is indicative of the compensating signal $e_{aux}$; which signal is fed back to the common connection between the drive coils to compensate and hence, cancel the error signal present at the output of the pickup coil 16.

As shown in FIG. 1, a timing and wave shaping reference generator 50 receives control signals from the logic and control circuitry 31. The timing and wave shaping circuitry 50 provides a gating signal to the amplitude error detector 39, while providing a gating signal and a reference signal to the phase error detector 38 and the variable phase shifter 42. The phase and amplitude detectors 38 and 39 are operated during predetermined intervals to detect the error signal and hence, provide a null operation.

Figure 2:
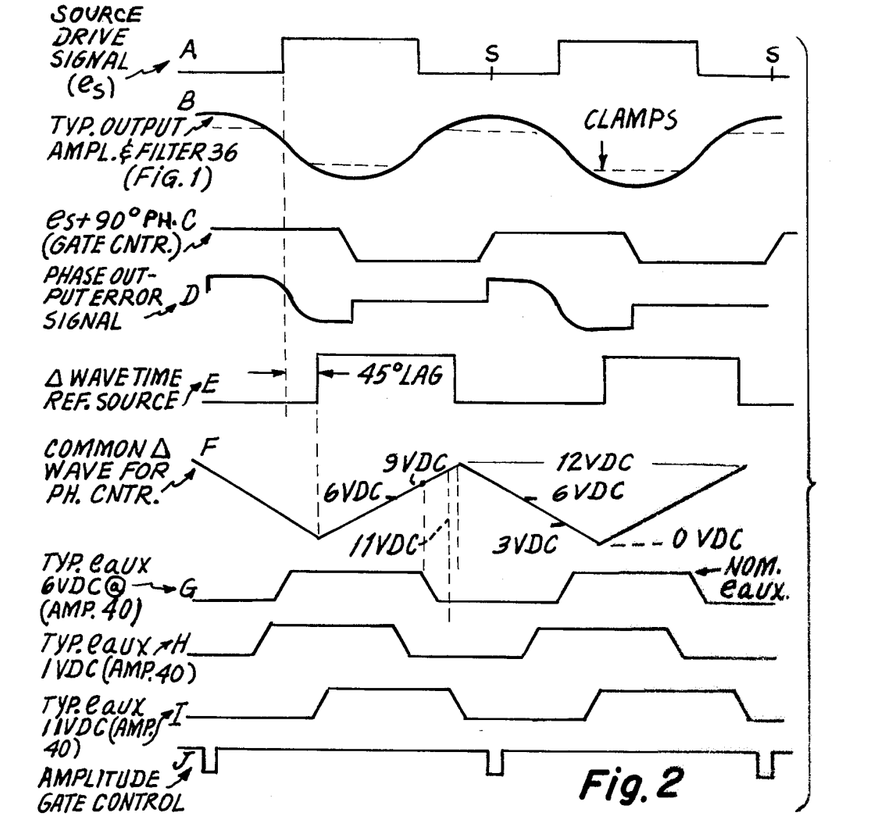
FIG. 2 depicts a series of waveforms A to J necessary to understand the operation of this invention.

Referring to FIG. 2, there is depicted a series of waveforms designated as A to J and which will aid in the explanation of the above described circuitry.

FIG. 2A depicts the drive source signal $e_s$ which is provided by generator 25 of FIG. 1 and is used to drive the coils 22 and 23 of the magnetic head 10. The signal depicted in FIG. 2A is also applied to the logic and control circuitry 31 described above.

The signal depicted in FIG. 2B is indicative of the type of output signal from the amplifier and filter 36 of FIG. 1 which constitutes an error signal emanating from the pickup coil 16 during the absence of a magnetic material in the vicinity of the coil as described. The dashed lines on the diagram indicates clamping levels as the AC signal is amplified and clamped to provide an approximate square wave.

As can be seen by comparing FIG. 2A with FIG. 2B, the signals are 180° out of phase in this particular example. It is of course, understood that based on the nature and the type of the unbalance, that the signals could also be in phase or almost in phase.

FIG. 2C depicts a signal which is generated by the timing and wave shaping reference circuit 50. This signal, as will be described, is applied to the phase detector 38 and essentially, is the $e_s$ signal advanced by 90°. There are many techniques known in the art to provide a reference signal such as that shown in FIG. 2C from a square wave of FIG. 2A, which signal is shifted by 90° with respect to the signal of FIG 2A.

Referring to FIG. 2D, there is shown a DC error signal which, as will be explained, is the output from the phase error detector 38 and which signal after filtering is indicative of the magnitude of the phase error detected.

FIG. 2E shows another timing signal which is also derived from the clock signal and is used to generate a triangular waveform as depicted in FIG. 2F to implement the phase control. The signal shown in FIG. 2E has the same frequency as the drive source $e_s$ but exhibits a lag angle of 45° relative to the drive source $e_s$ shown in FIG. 2A. The purpose of this 45° lag angle is to set the nominal phase position of the resulting compensating signal $e_{aux}$ to a mid range position so as to provide equal cancellation of both leading and lagging phase error signals relative to drive source $e_s$.

FIG. 2F, as can be ascertained, is a triangular waveform which is derived by integrating the square wave depicted in FIG. 2E. The triangular waveform of FIG. 2F is basically of the same phase angle as the waveform shown in FIG. 2E and is employed as a reference signal to generate the square wave output (indicative of the phase error), necessary to provide the compensating signal $e_{aux}$, as will be explained in detail.

The waveforms G,H and I depict representative waveforms which constitute typical $e_{aux}$ signals as provided by the circuitry to perform compensation. It is noted that the waveforms shown in FIGS. 2G to 2I are applied to the common connection of the driving coils 22 and 23 of FIG. 1 via resistor 45.

Figure 3:
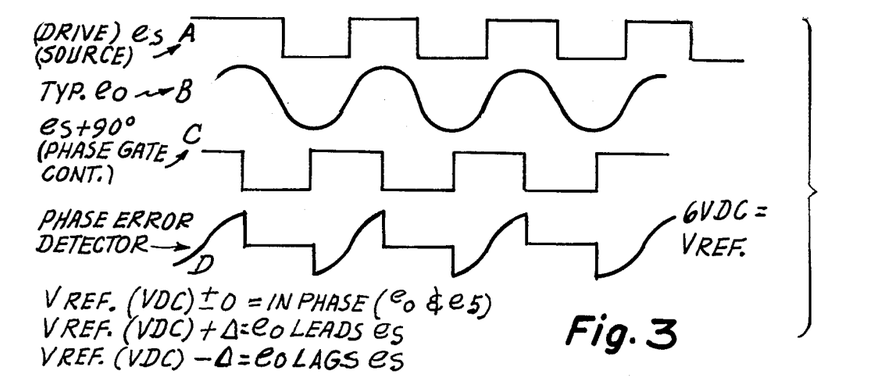
FIG. 3 depicts a series of waveforms A to D useful in explaining the operation of the phase detection circuitry.

Referring to FIG. 3, there is shown another series of waveforms as 3A to 3D. FIG. 3A again represents the drive signal $e_s$. FIG. 3B represents the signal $e_o$ emanating from the pickup coil 16 as amplified and filtered by amplifier 36 of FIG. 1. FIG. 3C shows a gating signal shifted 90° with respect to $e_s$ of FIG. 3A and is indicative of the signal shown in FIG. 2C. FIG. 3D shows the error signal before clipping and filtering, which signal provides a signal as shown in FIG. 2D.

The above waveforms depicted in FIG. 3 will provide a clearer understanding of the operation of the phase detection circuitry depicted in FIG. 1 and to be described in greater detail.

As can be seen from FIG. 3, the phase error signal 3D is referenced to six volts DC. If this signal is at six volts DC, the error signal is in phase with the drive signal $e_s$. As shown in FIG. 3, if there is a positive value greater than six volts, the error signal $e_o$ leads $e_s$ and if there is a value less than six volts, the error signal $e_o$ lags $e_s$.

Figure 4A:
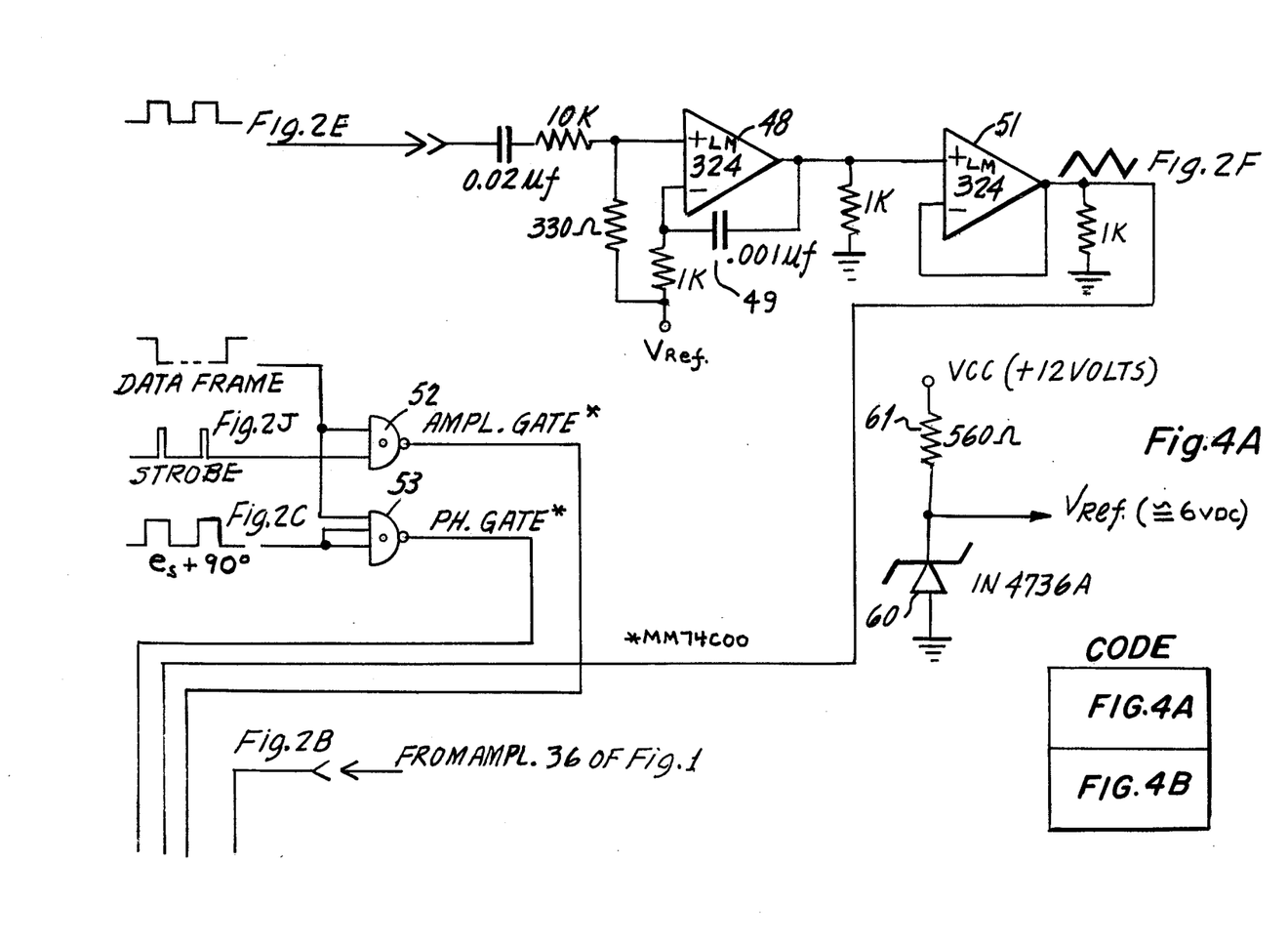
FIGS. 4A and 4B are a detailed schematic diagram of an amplitude and phase control apparatus according to this invention.
Figure 4B:
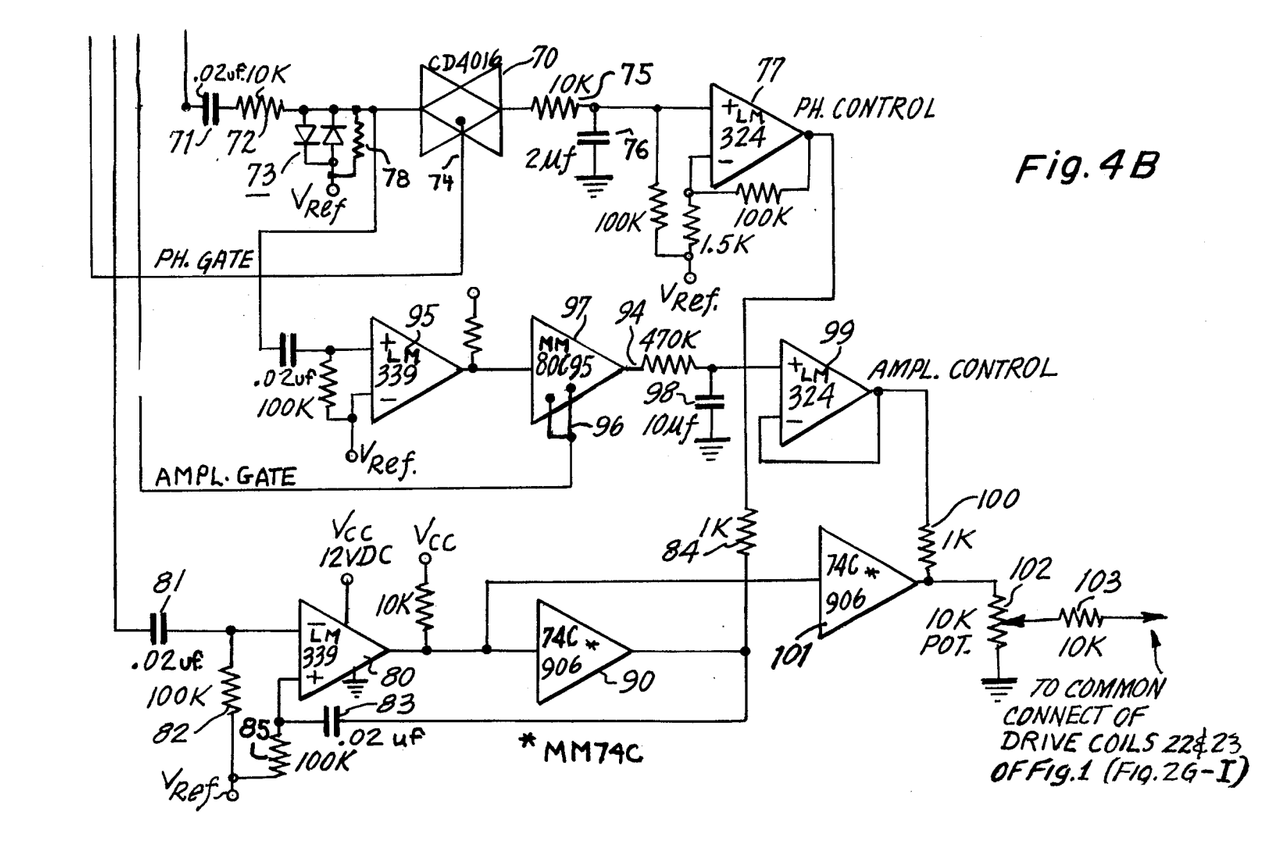

Referring to FIG. 4, there is shown a detailed block diagram of the phase and amplitude control according to FIG. 1. It will be noted that each component depicted in FIG. 4 possesses a number inside the pictorial module. These numbers as LM324, LM339, MM74C906, MM80C95, CD4016C depict commercially available integrated circuit modules, which are widely used and available through many sources. Hence, such integrated circuit components are conventionally available and for example, one can purchase these components from the National Semiconductor Corporation of Santa Clara, Calif. Many other companies such as Motorola, Texas Instruments, Fairchild provide either identical components using the same nomenclature or alternate components which perform equivalent functions. It is also noted that each component value necessary for proper circuit operation is depicted on the schematic of FIG. 4 and hence, FIG. 4 constitutes a complete electrical schematic diagram depicting operation to be described.

Referring to FIG. 4, the waveform depicted in FIG. 2E which is lagging the drive signal $e_s$ by 45° is coupled through a series resistor and capacitor and is applied to the input of the operational amplifier 48. The amplifier 48, as indicated in the schematic, is a conventional high gain operational amplifier available as an integrated circuit (LM324). The amplifier 48 is arranged in an integrating configuration by means of the feedback capacitor 49 coupled between the output and the inverting terminal. Hence, the amplifier integrator 48 integrates the square wave shown in FIG. 2E to provide at its output, a triangular wave as shown in FIG. 2F. The triangular wave is applied to the input of an operational amplifier 51 which is arranged as a buffer amplifier to provide the final triangular output as depicted in FIG. 2F.

Before proceeding further, it is noted that all circuits are biased by a source of potential designated as $V_{cc}$ depicted as +12 volts. Suitable reference voltages are obtained via the Zener diode 60 shown at the right of the diagram having its cathode coupled to $V_{cc}$ via the resistor 61. The connection between resistor 61 and the cathode of the Zener diode 60 is designated as $V_{ref}$ which is a six volt reference signal employed in circuit operation.

Shown in FIG. 4 are two digital gates 52 and 53. Gates 52 and 53 are NAND gates. As seen, one input terminal of each gate 52 and 53 is coupled to an input signal designated as data frame. As explained above, the magnetic head 10 of FIG. 1 is one of a plurality of heads which are employed in a card reader. Each time a credit card is inserted into the reader, a data frame signal is inhibited and hence, gates 52 and 53 are inhibited and the compensation circuitry as shown in FIG. 1 and FIG. 4 is thereby inhibited to respond to any new changes in the error signal but will continue to provide for some time, the same compensating signal $e_{aux}$ that was valid during the time just prior to the inhibiting action of the data frame signal. In any event, during the absence of a card, a data frame signal is provided which activates both gates 52 and 53 and hence, causes circuit operation and compensating action to function.

Gate 52 is designated as the amplitude gate and has applied to a second input, a strobe pulse. The strobe pulse is generated so as to be positioned in time relative to the drive signal $e_s$ so that it appears virtually at locations of the drive signal as shown in FIG. 2A and designated as S. Again, the generation of a strobe pulse at the location shown in the timing waveform of FIG. 2J is well known in the art.

Gate 53 is designated as a phase gate and has applied to a second input, the square wave shown in FIG. 2C which, as explained, is 90° out of phase with the drive signal $e_s$ of FIG. 2A. Accordingly, the amplitude gate 52 will provide a strobe pulse at its output during the absence of a credit card in the vicinity of the head 10 or during the presence of the data frame signal. The phase gate 53 will provide the square wave as shown in FIG. 2C during the presence of the data frame signal indicative of the absence of a credit card in the vicinity of the head 10.

The above described amplifiers 48, 51 and gates 52 and 53 constitute the circuitry contained in the timing and wave shaping reference circuit 50 of FIG. 1. Again, it is clear and understood that the strobe and various square waves which are described in conjunction with the above and as shown in FIG. 2 are easily generated from the drive waveform $e_s$ of FIG 2A.

As shown in FIG. 4, the output from the amplifier and filter circuit 36 of FIG. 1, (FIG. 2B) is applied to the input of an integrated circuit module 70. The sinusoidal signal from amplifier and filter 36 is AC coupled via capacitor 71 and resistor 72 to clamp diodes 73 and resistor 78 which clamp the signal about the reference voltage $V_{ref}$, (+6 volts). Circuit 70 is an integrated circuit module designated as a CD 4016 and is essentially an analog switch which employs FETs to switch the signal applied to the input of module 70 to its output during the presence of a gating signal at terminal 74. The gating signal, as seen from the schematic, is the output from the phase gate 53.

Hence, during a positive level of the phase gate control (FIG. 2C), the switch module 70 applies the input to the output where it is integrated via resistor 75 and capacitor 76. This output is applied to the input of the operational amplifier 77 (LM324). The amplifier 77 amplifies the voltage across capacitor 76 and is referenced about the six volt level. This DC signal, which is indicative of the phase error emanating from amplifier and filter 36, is used to control the switching level of the comparator 80, as will be subsequently described.

It is noted that the switch 70 corresponds to the phase detector 38 of FIG. 1, while the amplifier 77 corresponds to amplifier 40 of FIG. 1. The variable phase shifter 42 of FIG. 1 is implemented in function by the comparator 80 and the output from buffer amplifier 90.

Referring to the comparator 80, it is identified as an LM339, which is an integrated circuit designated as a comparator. The inverting terminal of comparator 80 is AC coupled via capacitor 81 to the triangular waveform at the output of amplifier 51, which is the waveform shown in FIG. 2F. This input terminal is referenced via resistor 82 to the reference source $V_{ref}$. The error signal emanating from amplifier 77 is applied via resistor 84 to amplifier 90 and also through capacitor 83 to the non-inverting terminal of the comparator 80. This causes the output of the comparator 80 to switch as a square wave as the triangular wave passes about (+ or −) the reference level at the non-inverting input. This effective reference level is comprised of the $V_{ref}$ applied through a 100K. ohm resistor 85 and the level of feedback through capacitor 83. This reference level changes in accordance with the feedback as determined by the signal of the phase detector circuitry afforded by switch 70 and amplifier 77. The greater this DC level becomes, the greater is the threshold at which the comparator 80 will switch. As can be seen from FIGS. 2G to 2I, the $e_{aux}$ signal is then provided.

Essentially, as the level of the phase error signal (FIG. 2D) increases above $V_{ref}$, the comparator switches at an increasing DC level as determined by the triangular wave shape. This provides a delay to effectively shift the output later in time and thus corresponds to a phase lag. Conversely, as the level of the phase error signal decreases below $V_{ref}$, the comparator switches at a decreasing DC level as determined by the triangular wave shape and thus effectively shifts the output to occur sooner in time which constitutes a phase lead. The nominal output from the comparator 80 is achieved when the phase detector output via amplifier 77 is at six volts which is the same value as the reference voltage. Therefore, any variation up to twelve volts or down to zero volts emanating from the phase control amplifier 77 will force the comparator output to either lag or lead the nominal output by 45° respectively. Thus full compensation over the entire range is provided.

Also shown as part of the comparator circuit is an output buffer amplifier 90. The amplifier 90 is an integrated circuit which is used as an effective buffer amplifier (MM74C906). It is of the open drain field effect transistor configuration which enables control of the positive input terminal of the comparator as described, via resistor 84 and capacitor 83.

Because comparator 80 is interconnected for the inverting mode of operation, the feedback signal from buffer amplifier 90 is degenerative. The magnitude and shape of the feedback signal indicative of zero phase error is a square wave with a six volt peak to peak (P-P)

amplitude. The amplitude is determined by the output of amplifier 77. If a leading phase angle error is determined, the feedback signal will increase in amplitude to greater than six volts (P-P). Conversely, for a lagging phase angle error, the feedback signal will decrease in amplitude to less than six volts peak to peak. The maximum and minimum amplitude limits of this square wave feedback signal vary from twelve volts (P-P) to 0.0 volts (P-P). These limits correspond to a phase shift in the compensating signal $e_{aux}$ about its nominal position from 45° lag to 45° lead. The comparator 80 and the buffer amplifier 90 comprise the variable phase shifter 42 depicted in FIG. 1.

As shown in FIG. 4, the clipped sinusoidal signal from the amplifier filter 36 of FIG. 1 is applied to the input of comparator 95 (LM339). The negative input of the comparator is coupled to the reference source. The comparator 95 functions similar to a high gain, level shifting the amplifier in that it transforms a relatively low level analog signal biased at $V_{ref}$ into a relatively large digital signal switching as a square wave between +12 volts and 0.0 volts. Because the input to comparator 95 is applied to the non-inverting (+) terminal, there is no phase inversion at the output. Thus a (+) or (−) voltage excursion about the $V_{ref}$ at the input results in a digital output, switching between the logic levels of +12 volts and ground respectively.

The output of the comparator 95 is coupled to the input of an integrated circuit. This integrated circuit 97 is designated as a tri-state hex buffer (MC80C95). Essentially, this circuit constitutes a digital switch and it functions to switch the input level to the output during the presence of a switching signal at terminal 96. The input signal to terminal 96 is the amplitude gate signal or strobe emanating from gate 52 and can be characterized as a narrow pulse.

The hex buffer 97 will provide a logic level of 12 volts or ground at its output during the presence of the strobe pulse, but will exhibit a very high output impedance in the absence of the strobe pulse independent of the input logic conditions. Therefore, when the strobe pulse is inhibited, the output of the hex buffer 97 has negligible effect on the voltage appearing at the integrator of resistor 94 and capacitor 98. The timing of this strobe pulse applied to terminal 96 is strategically arranged via gating techniques within the logic and control circuitry 31 of FIG. 1 to appear in time near the midpoint of only one-half of the drive source $e_s$ (FIG. 2A and FIG. 2J). As the comparator 95 switches (+12 volts and ground) in accordance with the excursion of the input voltage about $V_{ref}$, the output of the hex buffer 97 provides narrow pulses of the same width as the strobe and of the same logic level as that of the comparator output, to the integrator network. Capacitor 98 has a charge determined by the magnitude of resistor 94 and the pulse width output. Because of the high output impedance of the buffer 97 in the absence of the strobe pulse, and the high input impedance of amplifier 99, the capacitor 98 will tend to retain its charge and the charge is varied only by the pulses emanating from resistor 94. The voltage across capacitor 98 will slowly track, in accordance with the timing of the strobe, the voltage appearing at the input of comparator 95 which is directly representative of the undesired amplitude offset signal appearing at the output of amplifier and filter 36 of FIG. 1. Thus, the voltage across capacitor 98 is indicative of the undesired amplitude offset as measured at the junction of capacitor 71 and resistor 72. If this undesired amplitude offset at the time of the strobe is positive with respect to $V_{ref}$, the voltage across capacitor 98 will become more positive up to a maximum of +12 volts, and conversely, if this undesired amplitude offset at the time of the strobe is negative with respect to $V_{ref}$, the voltage across the capacitor 98 will become less positive down to a minimum of zero volts. The nominal voltage across capacitor 98 is six volts which is representative of a minimum undesired amplitude offset.

As indicated, the output of the hex buffer 97 is applied via the integrator consisting of resistor 94 and capacitor 98 to the input of an operational amplifier acting as a buffer amplifier 99 of the same configuration as amplifier 51. Buffer amplifier 99 exhibits a very high input impedance and a relatively low output impedance. The output of amplifier 99 which represents the required compensating signal amplitude is applied via resistor 100 to the output terminal of the effective summing amplifier 101 which is an open drain (FET) device as buffer amplifier 90. Another input to amplifier 101 is derived from the output of the comparator 80 which represents the required compensating phase angle and hence, amplifier 101 combines the amplitude offset signal and the phase angle error signal to provide a composite compensating signal to potentiometer 102. This potentiometer provides for adjusting the compensating signal to a nominal value at midrange for output via the variable slider arm. The signal output is depicted in FIGS. 2G to 2I and has both amplitude and phase determined by the signal propagating via amplifier and filter 36 of FIG. 1. The output from potentiometer 102 is applied via a current limiting resistor 103 to the common connection between the series horizontal drive coils 22 and 23 of FIG. 1.

As can be ascertained from the above description, the comparator 95, buffer 97 and integrator (94 and 98) function as detector 39 of FIG. 1, while the amplifier 99 functions as amplifier 41 of FIG. 1. The amplifier 101 performs the function of amplifier 43 of FIG. 1 with potentiometer 102 corresponding to potentiometer 44 and resistor 103 corresponding to resistor 45.

Thus the above noted circuitry provides phase and amplitude control for the drive system associated with the magnetic head 10 of FIG. 1. Accordingly, the system will operate over an extremely wide range of temperatures to always assure that the output from the pickup coil 16 of FIG. 1 is always at null. As indicated above, one can therefore eliminate both windings 17 and 18 and potentiometer 20 as shown in FIG. 1 as the circuit achieves automatic balancing as described for both amplitude and phase.

It is particularly interesting to note that the comparator 80 is caused to provide an error signal according to the magnitude of the DC phase control signal provided at the output of amplifier 77. The amplitude and phase signals are combined to produce a composite square wave signal of a compensating amplitude and phase, which signal cancels any residual signal which may be present at the output of the pickup coil 16.

It is noted that the above described circuitry as shown and depicted in FIGS. 1 and 4 is necessary for each head as 10 as provided in a data storage retrieval system of the type depicted in U.S. Pat. No. 4,130,242. It will also be understood by those skilled in the art that the compensating scheme depicted herein will have applicability to the control of amplitude and phase in other quadrature type systems and is not necessarily limited to magnetic circuitry.

As indicated above, both the amplitude and phase gates 52 and 53 are disabled when a card is being read. In any event, there is enough delay in the circuit to allow the $e_{aux}$ signal to compensate, as for example, capacitor 98 (10 ufd) associated with the amplitude compensating circuit. In this manner, disabling of the amplitude gate 52 enables compensation over the short period of a card reading (less than one second). The phase gate may or may not be disabled as well, due to the inherent delays in the phase compensating circuitry (as capacitor 76). However, as is understood, one may disable the amplitude circuitry without the phase or vice-versa without effecting compensating operation during the short time period required for card reading.

The above and other alternatives will become apparent to those skilled in the art and are deemed to be encompassed within the spirit and scope of the invention by referring to the claims appended hereto.

I claim:

1. A balancing apparatus for providing a null at the output of a quadrature circuit of the type driven by a drive source for providing a first signal at a given frequency and of a reference phase and a second signal at the same frequency of a phase relatively about said reference phase, said circuit operating to provide a null signal at an output manifesting a zero voltage output during a balanced condition when said quadrature circuit is not effected by the presence of a desired unbalancing means, said quadrature circuit undesirably providing a random output signal at said frequency due to an undesired unbalance as manifested by an interfering external source, comprising:
  (a) first means responsive to said random output signal to provide an amplified version of said signal at said given frequency,
  (b) amplitude detecting means responsive to said random output signal to provide an amplitude compensating signal at said frequency indicative of the amplitude of said random signal,
  (c) phase detecting means operative to provide a DC error signal indicative of the phase of said random signal with respect to a predetermined reference phase,
  (d) phase comparator means operative to compare a reference waveform at a first input with a DC reference level at a second input to provide at an output, a phase compensating signal at said frequency having a phase indicative of the difference between said reference waveform and said DC level,
  (e) means for generating a reference waveform indicative of a reference phase from said drive source for applying said reference waveform to said first input of said comparator means,
  (f) means for applying said DC error signal to said second input of said comparator means to cause said comparator means to provide at said output, said phase compensating signal of a phase determined by said DC error signal,
  (g) summing means responsive to said amplitude compensating signal and said phase compensating signal to provide at the output, a summed signal indicative of the phase and amplitude of said random signal, and
  (h) means for applying said summed signal to said drive source to compensate for said random signal and therefore for said unbalance as manifested by said interfering external source.

2. The balancing apparatus according to claim 1 wherein said quadrature circuit is a magnetic circuit of a "U" shaped configuration having a right vertical pole and a left vertical pole, said poles joined together by the horizontal base member of said "U", with first and second coils in series about said base member and operative to drive said poles from said drive source, a central pickup means disposed between said poles and operative to provide said null signal manifesting a zero output voltage when said coils and driving said circuit during the absence of a desired magnetic material between one of said poles and said central pickup means, said random signal undesirably appearing at said pickup means due to an undesired change to cause said random signal to undesirably appear.

3. The balancing apparatus according to claim 1 wherein said amplitude detecting means comprises an amplitude comparator having said random signal applied to one input and having a reference voltage applied to a second input, to provide at an output, an amplitude compensating signal indicative of the amplitude of said random signal.

4. The balancing apparatus according to claim 1 wherein said phase detecting means includes a switch operative to provide at an output, a varying DC signal according to the phase difference between said random signal and a reference switching signal indicative of a reference phase of said drive source, with said reference switching signal operative to switch said switch to cause the input signal as derived from said random signal to appear at said output according to said reference switching signal.

5. The balancing apparatus according to claim 1 wherein said means for generating said reference waveform comprises a triangular waveform generator adapted to receive a reference phase signal from said drive source to provide at an output, a triangular signal indicative of said reference phase and at a repetition rate according to said given frequency.

6. The balancing circuit according to claim 2 further including gating means coupled to said amplitude and phase detecting means and responsive to the presence of a desired magnetic material to inhibit operation of said amplitude and phase detecting means and to enable operation during the absence of said desired magnetic material.

7. The balancing circuit according to claim 1 wherein said means for applying said summed signal includes variable impedance means responsive to said signal for adjusting the value of said signal within predetermined limits prior to application of the same to said drive source.

8. The balancing circuit according to claim 2 wherein said magnetic circuit is employed in a data retrieval system operative to detect the presence of a desired magnetic material between said pickup means and said right vertical pole as said first phase signal at the output of said pickup means indicative of a first binary state and operative to provide said second phase signal at said pickup means indicative of a second binary state during the presence of magnetic material between said left vertical pole and said pickup means.

9. The balancing apparatus according to claim 1 wherein said phase detecting means compares said random signal phase with a reference phase ninety degrees out of phase with said first reference phase.

10. The balancing apparatus according to claim 1 wherein said reference waveform as generated lags said first reference phase by forty-five degrees.

11. The balancing apparatus according to claim 3 wherein said comparator further comprises a tri-state hex buffer adapted to receive at one input a signal indicative of said random signal and at another input a strobe signal indicative of the timing of said reference source, an integrator having an input coupled to the output of said buffer, with said buffer manifesting a high output impedance during the absence of said strobe, and a lower output impedance during the presence of said strobe to cause said integrator to provide a maintained amplitude compensating signal indicative of the amplitude of said random signal.

* * * * *